(12) United States Patent
Silverbrook

(10) Patent No.: US 7,140,723 B2
(45) Date of Patent: *Nov. 28, 2006

(54) MICRO-ELECTROMECHANICAL DEVICE FOR DISPENSING FLUID

(75) Inventor: Kia Silverbrook, Balmain (AU)

(73) Assignee: Silverbrook Research Pty Ltd, Balmain (AU)

( * ) Notice: Subject to any disclaimer, the term of this patent is extended or adjusted under 35 U.S.C. 154(b) by 0 days.

This patent is subject to a terminal disclaimer.

(21) Appl. No.: 10/957,718

(22) Filed: Oct. 5, 2004

(65) Prior Publication Data

US 2005/0110837 A1    May 26, 2005

Related U.S. Application Data

(63) Continuation of application No. 10/184,883, filed on Jul. 1, 2002, now Pat. No. 6,820,968, which is a continuation of application No. 09/113,070, filed on Jul. 10, 1998, now Pat. No. 6,476,863.

(30) Foreign Application Priority Data

Jul. 15, 1997  (AU)  .................................... PO7988
Jul. 15, 1997  (AU)  .................................... PO7991

(51) Int. Cl.
    *B41J 2/05* (2006.01)
(52) U.S. Cl. .............................. 347/70; 347/71; 347/68
(58) Field of Classification Search ................. 347/70, 347/71, 68, 54, 56, 65, 59
    See application file for complete search history.

(56) References Cited

U.S. PATENT DOCUMENTS

| | | | |
|---|---|---|---|
| 4,837,628 A | 6/1989 | Sasaki | 358/209 |
| 4,868,676 A | 9/1989 | Matsuura et al. | 358/296 |
| 4,897,724 A | 1/1990 | Veldhuis | 358/166 |
| 4,937,676 A | 6/1990 | Finelli et al. | 358/229 |
| 5,184,169 A | 2/1993 | Nishitani | |
| 5,356,971 A | 10/1994 | Sagawa et al. | 524/275 |
| 5,398,131 A | 3/1995 | Hall et al. | 359/465 |
| 5,534,900 A | 7/1996 | Ohno et al. | 347/54 |
| 5,734,154 A | 3/1998 | Jachimowicz et al. | 235/492 |
| 5,818,023 A | 10/1998 | Meyerson et al. | 235/462 |
| 5,825,383 A | 10/1998 | Abe et al. | 347/54 |
| 5,835,136 A | 11/1998 | Watanabel et al. | 348/207 |
| 6,137,509 A * | 10/2000 | Hayasaki | 347/59 |
| 6,234,608 B1 | 5/2001 | Genovese et al. | 347/54 |
| 6,357,865 B1 * | 3/2002 | Kubby et al. | 347/68 |
| 6,820,968 B1 * | 11/2004 | Silverbrook | 347/70 |

FOREIGN PATENT DOCUMENTS

| | | |
|---|---|---|
| EP | 0382044 | 8/1990 |
| EP | 0398295 | 11/1990 |
| EP | 763930 | 3/1997 |
| WO | WO 95/16323 | 6/1995 |
| WO | WO 96/32265 | 10/1996 |
| WO | WO 97/06958 | 2/1997 |
| WO | WO 97/06958 A | 2/1997 |

\* cited by examiner

Primary Examiner—Stephen Meier
Assistant Examiner—Lam S. Nguyen (57) ABSTRACT

A micro-electromechanical device includes a substrate. A drive circuitry layer is positioned on the substrate. A nozzle chamber wall and a roof wall are positioned on the substrate to define a nozzle chamber above the substrate and a fluid ejection port in the roof wall. A substantially planar deformable fluid ejecting member is interposed between the substrate and the roof wall and is configured to deform cyclically under action of a pulsed electromagnetic field. The drive circuitry is configured to generate said pulsed electromagnetic field so that the fluid ejecting member acts on fluid to eject fluid from the fluid ejection port.

5 Claims, 5 Drawing Sheets

MICRO-ELECTROMECHANICAL DEVICE FOR DISPENSING FLUID

CROSS REFERENCES TO RELATED APPLICATIONS

The present application is a continuation of U.S. application Ser. No. 10/184,883 filed on Jul. 1, 2002, now issued as U.S. Pat. No. 6,820,968, which is a continuation of U.S. application Ser. No. 09/113,070, filed Jul. 10, 1998, now issued as U.S. Pat. No. 6,476,863, the entire contents of which are herein incorporated by reference.

The following Australian provisional patent applications are hereby incorporated by cross-reference. For the purposes of location and identification, US patent applications identified by their US patent application serial numbers (USSN) are listed alongside the Australian applications from which the US patent applications claim the right of priority.

| Cross-Referenced Australian Provisional Patent No. | US Patent Application (Claiming Right of Priority from Australian Provisional Application) | Docket No. |
| --- | --- | --- |
| PO7991 | 6,750,901 | ART01 |
| PO8505 | 6,476,863 | ART02 |
| PO7988 | 6,788,336 | ART03 |
| PO9395 | 6,322,181 | ART04 |
| PO8017 | 6,597,817 | ART06 |
| PO8014 | 6,227,648 | ART07 |
| PO8025 | 6,727,948 | ART08 |
| PO8032 | 6,690,419 | ART09 |
| PO7999 | 6,727,951 | ART10 |
| PO7998 | 09/112,742 | ART11 |
| PO8031 | 09/112,741 | ART12 |
| PO8030 | 6,196,541 | ART13 |
| PO7997 | 6,195,150 | ART15 |
| PO7979 | 6,362,868 | ART16 |
| PO8015 | 09/112,738 | ART17 |
| PO7978 | 09/113,067 | ART18 |
| PO7982 | 6,431,669 | ART19 |
| PO7989 | 6,362,869 | ART20 |
| PO8019 | 6,472,052 | ART21 |
| PO7980 | 6,356,715 | ART22 |
| PO8018 | 09/112,777 | ART24 |
| PO7938 | 6,636,216 | ART25 |
| PO8016 | 6,366,693 | ART26 |
| PO8024 | 6,329,990 | ART27 |
| PO7940 | 09/113,072 | ART28 |
| PO7939 | 6,459,495 | ART29 |
| PO8501 | 6,137,500 | ART30 |
| PO8500 | 6,690,416 | ART31 |
| PO7987 | 09/113,071 | ART32 |
| PO8022 | 6,398,328 | ART33 |
| PO8497 | 09/113,090 | ART34 |
| PO8020 | 6,431,704 | ART38 |
| PO8023 | 09/113,222 | ART39 |
| PO8504 | 09/112,786 | ART42 |
| PO8000 | 6,415,054 | ART43 |
| PO7977 | 09/112,782 | ART44 |
| PO7934 | 6,665,454 | ART45 |
| PO7990 | 6,542,645 | ART46 |
| PO8499 | 6,486,886 | ART47 |
| PO8502 | 6,381,361 | ART48 |
| PO7981 | 6,317,192 | ART50 |
| PO7986 | 09/113,057 | ART51 |
| PO7983 | 09/113,054 | ART52 |
| PO8026 | 6,646,757 | ART53 |
| PO8027 | 09/112,759 | ART54 |
| PO8028 | 6,624,848 | ART56 |
| PO9394 | 6,357,135 | ART57 |
| PO9396 | 09/113,107 | ART58 |
| PO9397 | 6,271,931 | ART59 |
| PO9398 | 6,353,772 | ART60 |
| PO9399 | 6,106,147 | ART61 |
| PO9400 | 6,665,008 | ART62 |
| PO9401 | 6,304,291 | ART63 |
| PO9402 | 09/112,788 | ART64 |
| PO9403 | 6,305,770 | ART65 |
| PO9405 | 6,289,262 | ART66 |
| PP0959 | 6,315,200 | ART68 |
| PP1397 | 6,217,165 | ART69 |
| PP2370 | 6,786,420 | DOT01 |
| PP2371 | 09/113,052 | DOT02 |
| PO8003 | 6,350,023 | Fluid01 |
| PO8005 | 6,318849 | Fluid02 |
| PO9404 | 09/113,101 | Fluid03 |
| PO8066 | 6,227,652 | IJ01 |
| PO8072 | 6,213,588 | IJ02 |
| PO8040 | 6,213,589 | IJ03 |
| PO8071 | 6,231,163 | IJ04 |
| PO8047 | 6,247,795 | IJ05 |
| PO8035 | 6,394,581 | IJ06 |
| PO8044 | 6,244,691 | IJ07 |
| PO8063 | 6,257,704 | IJ08 |
| PO8057 | 6,416,168 | IJ09 |
| PO8056 | 6,220,694 | IJ10 |
| PO8069 | 6,257,705 | IJ11 |
| PO8049 | 6,247,794 | IJ12 |
| PO8036 | 6,234,610 | IJ13 |
| PO8048 | 6,247,793 | IJ14 |
| PO8070 | 6,264,306 | IJ15 |
| PO8067 | 6,241,342 | IJ16 |
| PO8001 | 6,247,792 | IJ17 |
| PO8038 | 6,264,307 | IJ18 |
| PO8033 | 6,254,220 | IJ19 |
| PO8002 | 6,234,611 | IJ20 |
| PO8068 | 6,302,528 | IJ21 |
| PO8062 | 6,283,582 | IJ22 |
| PO8034 | 6,239,821 | IJ23 |
| PO8039 | 6,338,547 | IJ24 |
| PO8041 | 6,247,796 | IJ25 |
| PO8004 | 6,557,977 | IJ26 |
| PO8037 | 6,390,603 | IJ27 |
| PO8043 | 6,362,843 | IJ28 |
| PO8042 | 6,293,653 | IJ29 |
| PO8064 | 6,312,107 | IJ30 |
| PO9389 | 6,227,653 | IJ31 |
| PO9391 | 6,234,609 | IJ32 |
| PP0888 | 6,238,040 | IJ33 |
| PP0891 | 6,188,415 | IJ34 |
| PP0890 | 6,227,654 | IJ35 |
| PP0873 | 6,209,989 | IJ36 |
| PP0993 | 6,247,791 | IJ37 |
| PP0890 | 6,336,710 | IJ38 |
| PP1398 | 6,217,153 | IJ39 |
| PP2592 | 6,416,167 | IJ40 |
| PP2593 | 6,243,113 | IJ41 |
| PP3991 | 6,283,581 | IJ42 |
| PP3987 | 6,247,790 | IJ43 |
| PP3985 | 6,260,953 | IJ44 |
| PP3983 | 6,267,469 | IJ45 |
| PO7935 | 6,224,780 | IJM01 |
| PO7936 | 6,235,212 | IJM02 |
| PO7937 | 6,280,643 | IJM03 |
| PO8061 | 6,284,147 | IJM04 |
| PO8054 | 6,214,244 | IJM05 |
| PO8065 | 6,071,750 | IJM06 |
| PO8055 | 6,267,905 | IJM07 |
| PO8053 | 6,251,298 | IJM08 |
| PO8078 | 6,258,285 | IJM09 |
| PO7933 | 6,225,138 | IJM10 |
| PO7950 | 6,241,904 | IJM11 |

-continued

| Cross-Referenced Australian Provisional Patent No. | US Patent Application (Claiming Right of Priority from Australian Provisional Application) | Docket No. |
|---|---|---|
| PO7949 | 6,299,786 | IJM12 |
| PO8060 | 09/113,124 | IJM13 |
| PO8059 | 6,231,773 | IJM14 |
| PO8073 | 6,190,931 | IJM15 |
| PO8076 | 6,248,249 | IJM16 |
| PO8075 | 6,290,862 | IJM17 |
| PO8079 | 6,241,906 | IJM18 |
| PO8050 | 6,565,762 | IJM19 |
| PO8052 | 6,241,905 | IJM20 |
| PO7948 | 6,451,216 | IJM21 |
| PO7951 | 6,231,772 | IJM22 |
| PO8074 | 6,274,056 | IJM23 |
| PO7941 | 6,290,861 | IJM24 |
| PO8077 | 6,248,248 | IJM25 |
| PO8058 | 6,306,671 | IJM26 |
| PO8051 | 6,331,258 | IJM27 |
| PO8045 | 6,111,754 | IJM28 |
| PO7952 | 6,294,101 | IJM29 |
| PO8046 | 6,416,679 | IJM30 |
| PO9390 | 6,264,849 | IJM31 |
| PO9392 | 6,254,793 | IJM32 |
| PP0889 | 6,235,211 | IJM35 |
| PP0887 | 6,491,833 | IJM36 |
| PP0882 | 6,264,850 | IJM37 |
| PP0874 | 6,258,284 | IJM38 |
| PP1396 | 6,312,615 | IJM39 |
| PP3989 | 6,228,668 | IJM40 |
| PP2591 | 6,180,427 | IJM41 |
| PP3990 | 6,171,875 | IJM42 |
| PP3986 | 6,267,904 | IJM43 |
| PP3984 | 6,245,247 | IJM44 |
| PP3982 | 6,315,914 | IJM45 |
| PP0895 | 6,231,148 | IR01 |
| PP0870 | 09/113,106 | IR02 |
| PP0869 | 6,293,658 | IR04 |
| PP0887 | 6,614,560 | IR05 |
| PP0885 | 6,238,033 | IR06 |
| PP0884 | 6,312,070 | IR10 |
| PP0886 | 6,238,111 | IR12 |
| PP0871 | 09/113,086 | IR13 |
| PP0876 | 09/113,094 | IR14 |
| PP0877 | 6,378,970 | IR16 |
| PP0878 | 6,196,739 | IR17 |
| PP0879 | 09/112,774 | IR18 |
| PP0883 | 6,270,182 | IR19 |
| PP0880 | 6,152,619 | IR20 |
| PP0881 | 09/113,092 | IR21 |
| PO8006 | 6,087,638 | MEMS02 |
| PO8007 | 6,340,222 | MEMS03 |
| PO8008 | 09/113,062 | MEMS04 |
| PO8010 | 6,041,600 | MEMS05 |
| PO8011 | 6,299,300 | MEMS06 |
| PO7947 | 6,067,797 | MEMS07 |
| PO7944 | 6,286,935 | MEMS09 |
| PO7946 | 6,044,646 | MEMS10 |
| PO9393 | 09/113,065 | MEMS11 |
| PP0875 | 09/113,078 | MEMS12 |
| PP0894 | 6,382,769 | MEMS13 |

STATEMENT REGARDING FEDERALLY SPONSORED RESEARCH OR DEVELOPMENT

Not applicable.

FIELD OF THE INVENTION

The present invention relates to fluid dispensing. In particular, this invention discloses a micro-electromechanical fluid-dispensing device.

BACKGROUND OF THE INVENTION

This invention is a development of a printing technology that has been developed by the Applicant. This development can be traced by considering the referenced patents/patent applications set out above.

Many different types of printing have been invented, a large number of which are presently in use. The known forms of printing have a variety of methods for marking the print media with a relevant marking media. Commonly used forms of printing include offset printing, laser printing and copying devices, dot matrix type impact printers, thermal paper printers, film recorders, thermal wax printers, dye sublimation printers and ink jet printers both of the drop on demand and continuous flow type. Each type of printer has its own advantages and problems when considering cost, speed, quality, reliability, simplicity of construction and operation etc.

In recent years, the field of ink jet printing, wherein each individual pixel of ink is derived from one or more ink nozzles has become increasingly popular primarily due to its inexpensive and versatile nature.

Many different techniques of ink jet printing have been invented. For a survey of the field, reference is made to an article by J Moore, "Non-Impact Printing: Introduction and Historical Perspective", Output Hard Copy Devices, Editors R Dubeck and S Sherr, pages 207–220 (1988).

Ink Jet printers themselves come in many different types. The utilisation of a continuous stream of ink in ink jet printing appears to date back to at least 1929 wherein U.S. Pat. No. 1,941,001 by Hansell discloses a simple form of continuous stream electro-static ink jet printing.

U.S. Pat. No. 3,596,275 by Sweet also discloses a process of continuous ink jet printing including the step wherein the ink jet stream is modulated by a high frequency electrostatic field so as to cause drop separation. This technique is still utilized by several manufacturers including Elmjet and Scitex (see also U.S. Pat. No. 3,373,437 by Sweet et al).

Piezoelectric ink jet printers are also one form of commonly utilized ink jet printing device. Piezoelectric systems are disclosed by Kyser et al. in U.S. Pat. No. 3,946,398 (1970) which utilises a diaphragm mode of operation, by Zolten in U.S. Pat. No. 3,683,212 (1970) which discloses a squeeze mode of operation of a piezoelectric crystal, Stemme in U.S. Pat. No. 3,747,120 (1972) discloses a bend mode of piezo-electric operation, Howkins in U.S. Pat. No. 4,459,601 discloses a Piezoelectric push mode actuation of the ink jet stream and Fischbeck in U.S. Pat. No. 4,584,590 which discloses a sheer mode type of piezoelectric transducer element.

Recently, thermal ink jet printing has become an extremely popular form of ink jet printing. The ink jet printing techniques include those disclosed by Endo et al in GB 2007162 (1979) and Vaught et al in U.S. Pat. No. 4,490,728. Both the aforementioned references disclosed inkjet printing techniques rely upon the activation of an electrothermal actuator which results in the creation of a bubble in a constricted space, such as a nozzle, which thereby causes the ejection of ink from an aperture connected to the confined space onto a relevant print media.

Manufacturers such as Canon and Hewlett Packard manufacture printing devices utilising the electro-thermal actuator.

As can be seen in the above referenced matters, Applicant has developed an ink jet printing technology that uses micro-electromechanical components to achieve the ejection of ink. The use of micro-electromechanical components allows printhead chips to have a large number of densely packed nozzle arrangements without the problems associated with heat build-up.

Applicant envisages that this technology can be used to dispense fluid. This invention is therefore intended to be a simple development of the technology that has already been the subject of many patent applications filed by the Applicant.

SUMMARY OF THE INVENTION

According to a first aspect of the invention, there is provided a micro-electromechanical device that comprises
- a substrate;
- a drive circuitry layer positioned on the substrate;
- a nozzle chamber wall and a roof wall positioned on the substrate to define a nozzle chamber above the substrate and a fluid ejection port in the roof wall; and
- a substantially planar deformable fluid ejecting member interposed between the substrate and the roof wall and configured to deform cyclically under action of a pulsed electromagnetic field, the drive circuitry configured to generate said pulsed electromagnetic field so that the fluid ejecting member acts on fluid to eject fluid from the fluid ejection port.

The nozzle chamber wall may define at least one fluid inlet to permit fluid to enter the nozzle chamber.

The drive circuitry layer may define a first planar electrode and the fluid ejecting member may include a second planar electrode which is connected to the drive circuitry layer such that an electrical potential can be set up between the electrodes, resulting in the fluid ejecting member being cyclically deformed to eject fluid from the fluid ejection port.

The micro-electromechanical device may include a support formation that extends from the substrate to support a periphery of the fluid ejecting member above the substrate, such that a central region of the fluid ejecting member is drawn towards and away from the substrate when the electrodes are activated.

The fluid ejecting member may be of a resiliently flexible member such that deformation of the member towards the substrate results in the build up of elastic energy in the member to enhance return movement and thus fluid ejection.

Complementary layers of hydrophobic material may be positioned on the ink ejecting member and the substrate to inhibit sticking of the ink ejecting member to the substrate. Instead or in addition a projection may be positioned on at least one of the fluid ejecting member and the substrate to inhibit sticking of the ink ejecting member to the substrate.

According to a second aspect of the invention, there is provided a fluid-dispensing chip that comprises
- a wafer substrate that incorporates drive circuitry, and
- a nozzle assembly positioned on the wafer substrate, the nozzle assembly comprising
  - nozzle chamber walls and a roof wall that define a nozzle chamber and a fluid ejection port in the roof wall, and
  - an electrostatic actuator that comprises
    - a first planar electrode positioned on the wafer substrate, and
    - a second planar electrode that is positioned in the nozzle chamber and is displaceable towards and away from the first planar electrode to eject fluid from the fluid ejection port, the first planar electrode and the second planar electrode being connected to the drive circuitry so that a potential difference can be applied between the planar electrodes to displace the second planar electrode towards and away from the first planar electrode,
    - at least one of the nozzle chamber walls and the wafer substrate defining a fluid inlet in fluid communication with the nozzle chamber and a fluid supply source. Said first planar electrode and said second planar electrode may define an air gap between the first and second planar electrodes.

At least one of the nozzle chamber walls and the substrate may define an air path in fluid communication with an external atmosphere so that air flows into and out of the air gap when the second planar electrode is displaced towards and away from the first planar electrode.

The electrodes may have facing surfaces that are coated with a material having a low coefficient of friction to reduce possibilities of stiction. Said material may comprise substantially polytetrafluoroethylene.

Instead, or in addition, one of the first and second planar electrodes may have at least one projection that extends towards the other electrode to ensure that the electrodes do not touch when the second planar electrode is displaced towards the first planar electrode.

Said second planar electrode may include a layer of stiffening material for maintaining a stiffness of the second planar electrode. The stiffening material may be silicon nitride.

The roof wall may define a plurality of etchant holes to facilitate etching of sacrificial layers during construction.

BRIEF DESCRIPTION OF THE DRAWINGS

Notwithstanding any other forms which may fall within the scope of the present invention, preferred forms of the invention will now be described, by way of example only, with reference to the accompanying drawings, in which.

DESCRIPTION OF PREFERRED AND OTHER EMBODIMENTS

Figure 1:
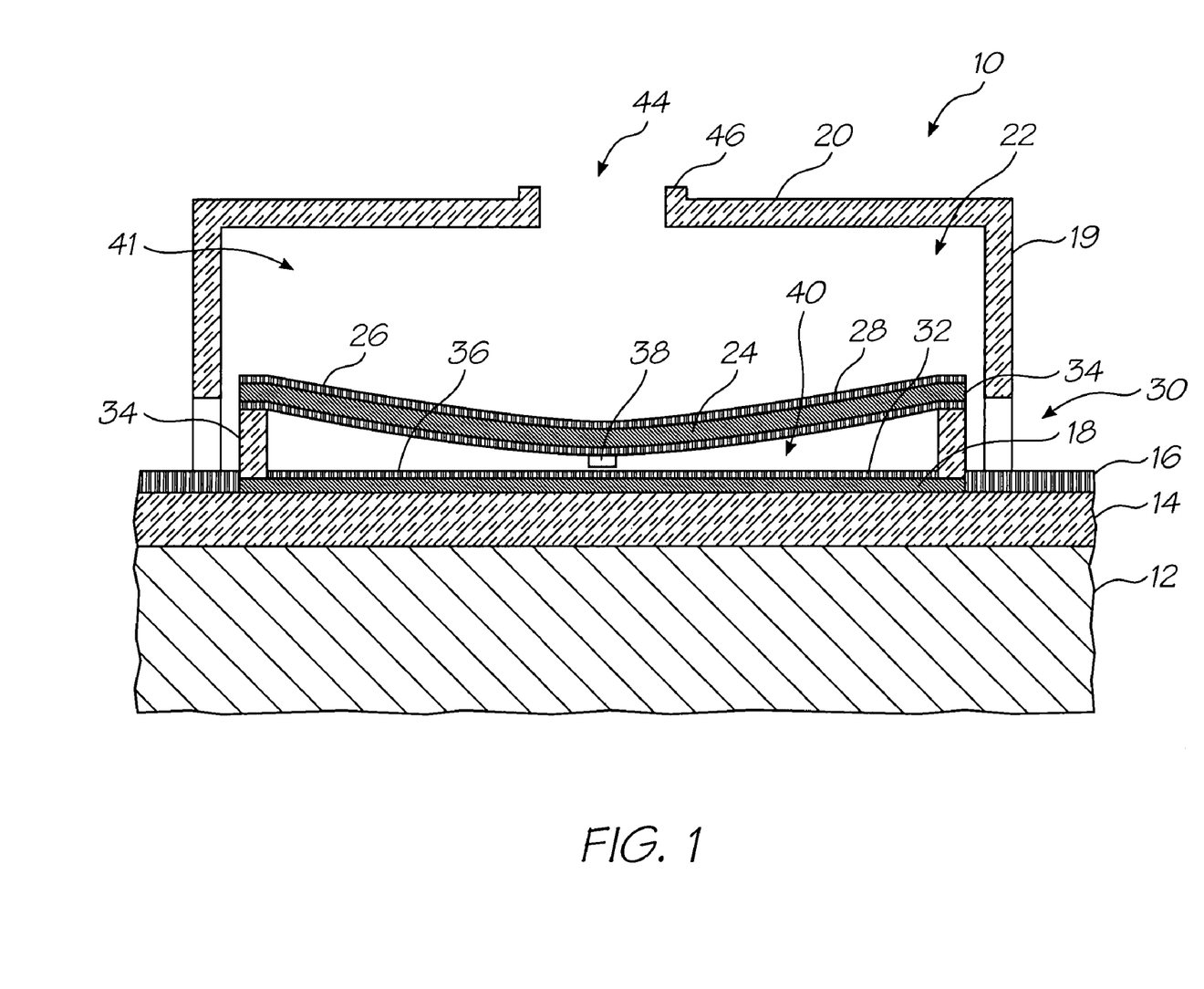
FIG. 1 is a sectioned side view of one embodiment of a fluid-dispensing chip of the invention, in an operative condition.
Figure 2:
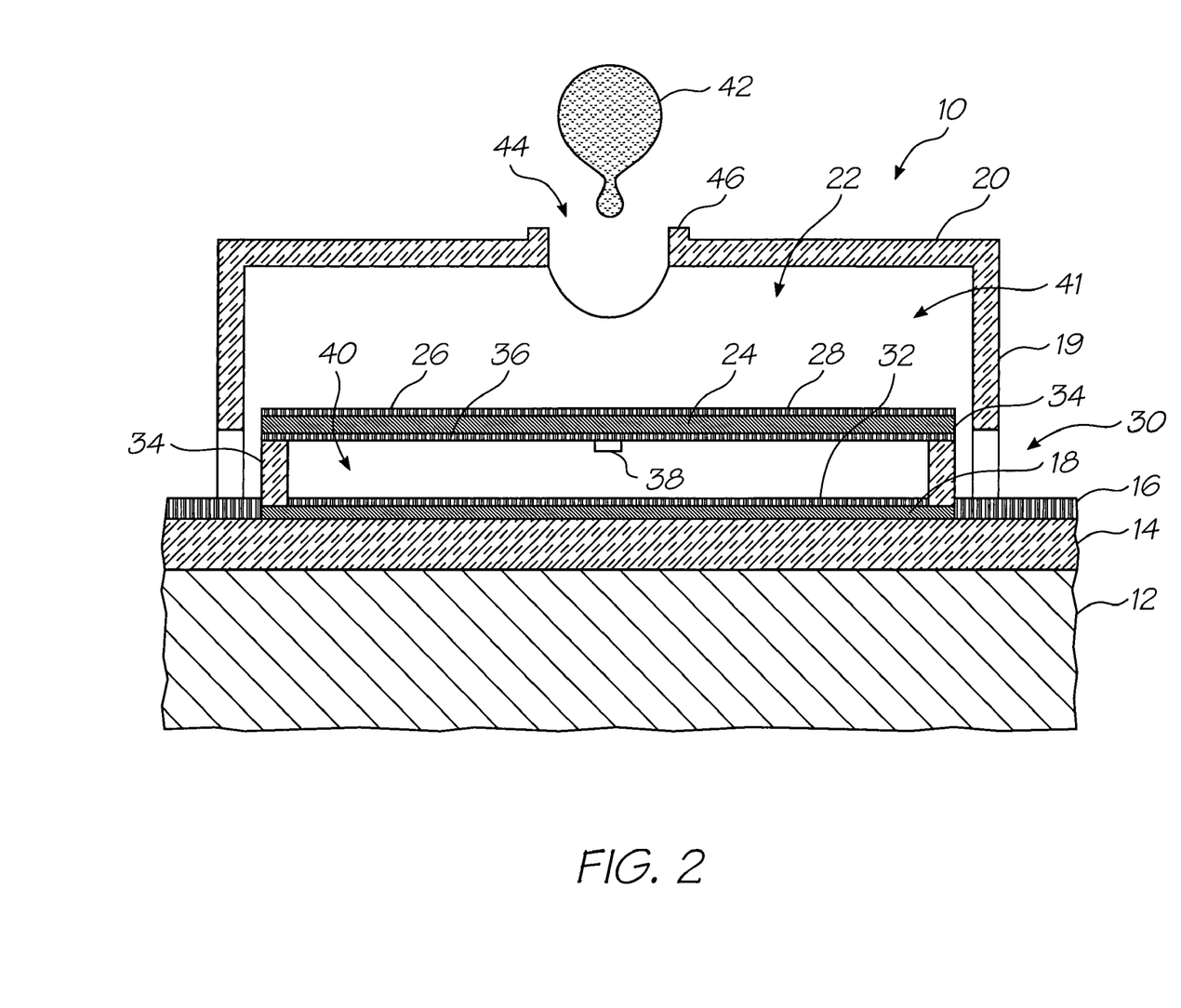
FIG. 2 is a sectioned side view of the fluid-dispensing chip of FIG. 1 in a quiescent condition.

In FIGS. 1 and 2, reference numeral 10 generally indicates a sectioned side view of one embodiment of a fluid-dispensing chip of the invention.

The fluid-dispensing chip may include a silicon wafer substrate 12. A drive circuitry layer 14 is positioned on the wafer substrate 12. The drive circuitry layer 14 is in the form of a CMOS two-level metal layer that includes the drive and control circuitry for the fluid-dispensing chip 10.

A passivation layer 16 of silicon nitride is positioned on the drive circuitry layer 14 to protect the drive circuitry layer 14. A first planar electrode 18 is embedded in the layer 16. The first planar electrode 18 is of aluminum and is connected to the drive circuitry layer 14.

The fluid-dispensing chip 10 includes a nozzle chamber wall 19 and a roof wall 20 that define a nozzle chamber 22.

The roof wall 20 defines a fluid ejection port 44. A fluid-ejecting member 28 is positioned in the nozzle chamber 22. The fluid-ejecting member 28 is planar and is aligned with and parallel to the first planar electrode 18.

The fluid-ejecting member 28 is positioned on a support formation 34 that extends from the passivation layer 16. The support formation 34 is dimensioned so that the fluid-ejecting member 28 is spaced a suitable distance from the first electrode 18. The support formation 34 is configured so that an air gap 40 is encapsulated between the fluid-ejecting member 28 and the first electrode 18.

The fluid-ejecting member 28 includes a second planar electrode 24 that is positioned in the nozzle chamber 22. The second planar electrode 24 is also of aluminum and is also connected to the drive circuitry layer 14. The drive circuitry layer 14 is connected to each of the electrodes 18, 24 so that a potential can be set up between the electrodes 18, 24 so that they are attracted to one another. A layer 26 of silicon nitride is positioned on the electrode 24 to impart a resilient flexibility to the fluid-ejecting member 28. Thus, when a potential is set up between the electrodes 18, 24, the fluid-ejecting member 28 is deflected towards the first electrode 18, as shown in FIG. 1. When the potential is removed, the first electrode 18 returns to a quiescent position as shown in FIG. 2.

A layer 32 of polytetrafluoroethylene (PTFE) is positioned on the first electrode 18. A layer 36 of PTFE is positioned on the second electrode 24, intermediate the electrodes 18, 24. This ensures that the electrodes 18, 24 do not stick to one another when the fluid-ejecting member 28 is deflected towards the first electrode 18. In order further to prevent stiction between the electrodes 18, 24, a projection 38 is positioned on the fluid-ejecting member 28. The projection 38 bears against the layer 32 to ensure that there is no contact between the layers 32, 36.

The nozzle chamber wall 19 defines fluid inlet openings 30 that are in fluid communication with a fluid supply so that the nozzle chamber 22 can be supplied with fluid. Fluid flows into a space 41 defined by the roof wall 20, the nozzle chamber wall 19, the fluid-ejecting member 28 and the support formation 34. It will be appreciated that this occurs when the fluid-ejecting member 28 is drawn towards the first electrode 18. When the potential is reversed, the fluid-ejecting member 28 is urged away from the first electrode 18 so that a drop 42 of fluid is ejected from the fluid ejection port 44. The fluid-ejecting member 28 could have sufficient resilience so that a reversal of potential is not necessary. In this case, release of elastic energy as the fluid-ejecting member 28 returns to its quiescent condition ensures the ejection of the fluid drop 42.

The roof wall 20 defines a rim 46 about the fluid ejection port 44.

Figure 3:
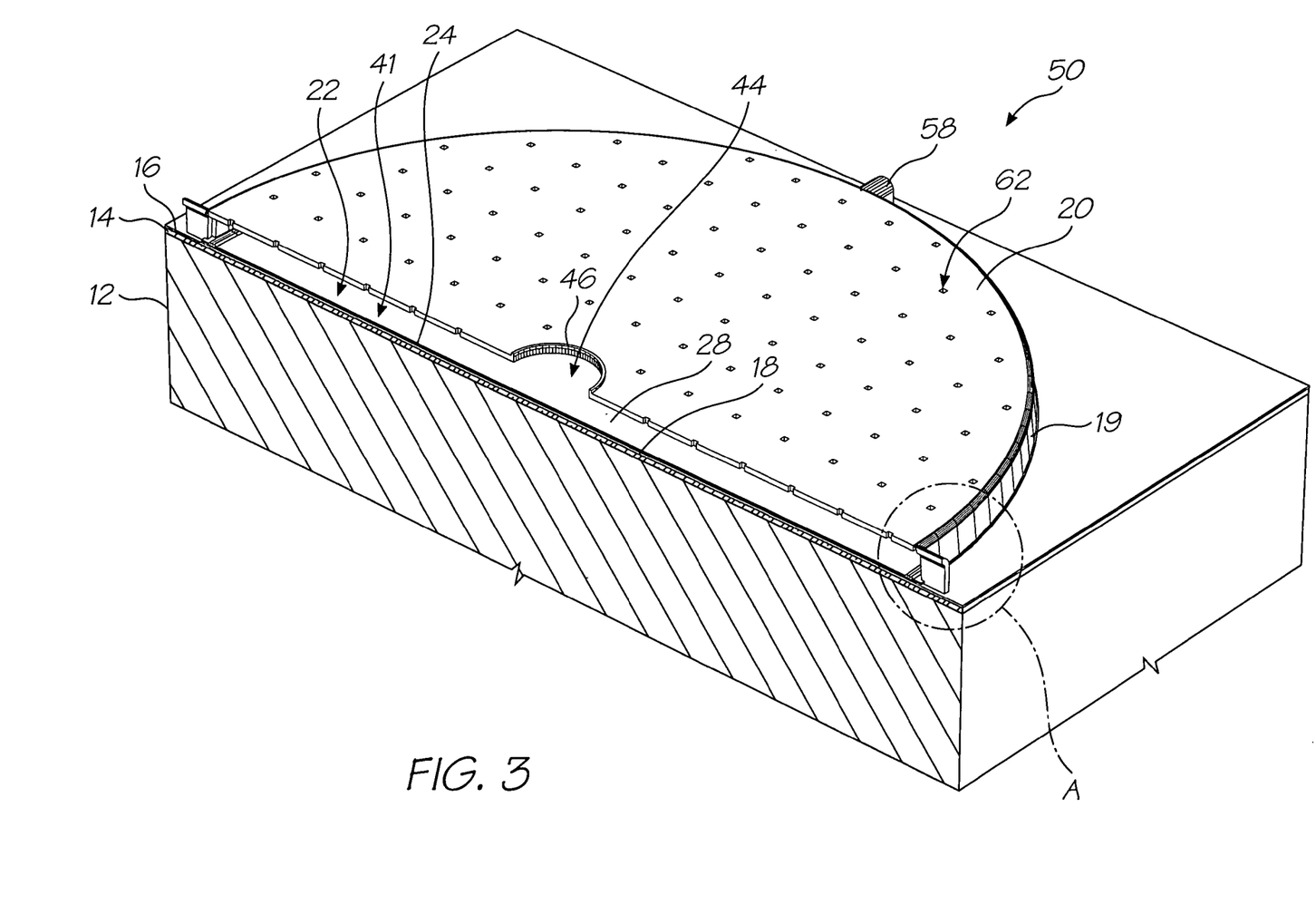
FIG. 3 is a perspective cross-sectional view of another embodiment of the fluid-dispensing chip of the invention.
Figure 4:
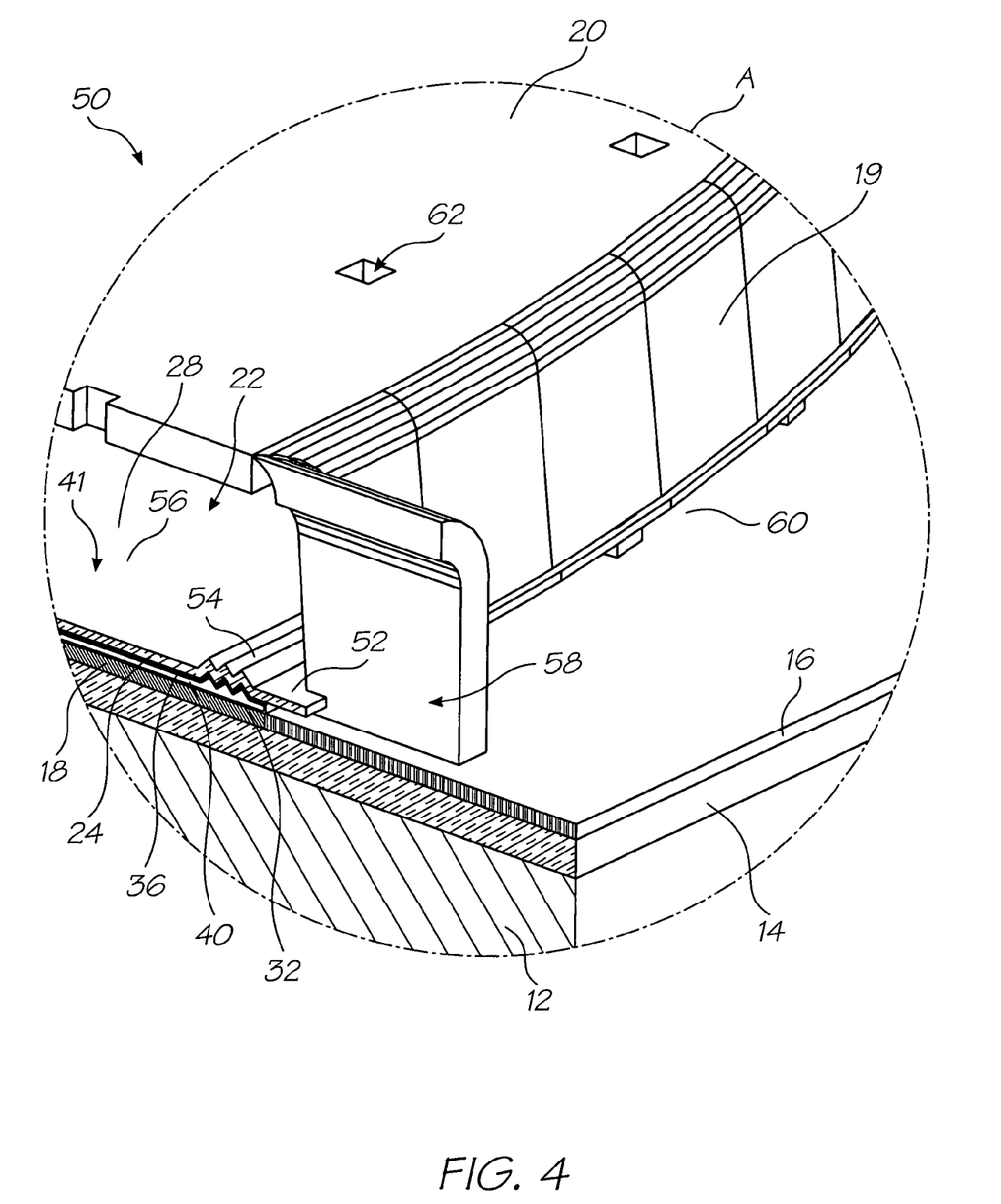
FIG. 4 is a close-up perspective cross-sectional view (portion A of FIG. 3), of the fluid-dispensing chip of FIG. 3.
Figure 5:
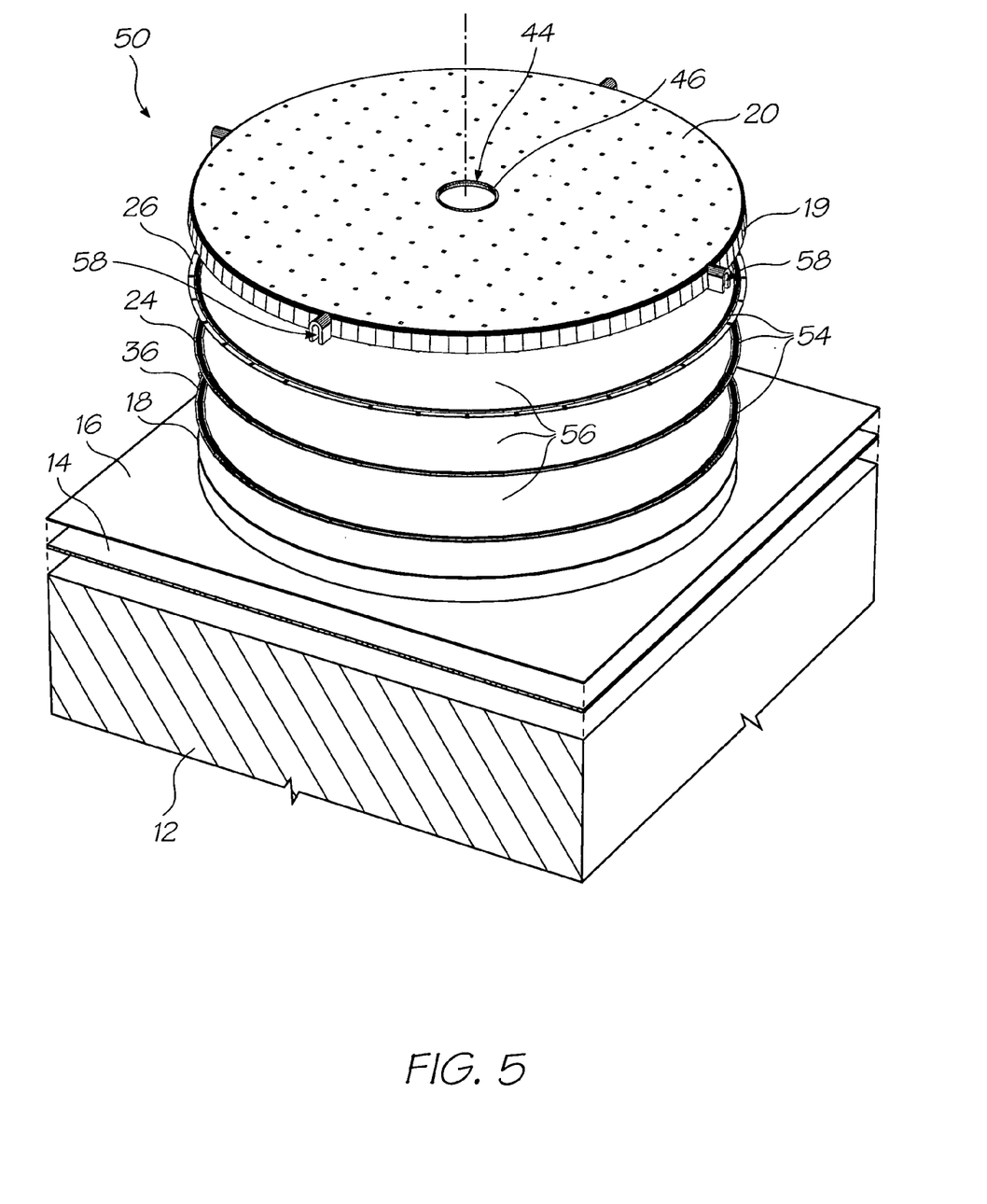
FIG. 5 is an exploded perspective view illustrating the construction of the fluid-dispensing chip of FIG. 3.

In FIGS. 3 to 5, reference numeral 50 generally indicates another embodiment of a fluid-dispensing chip of the invention. With reference to FIGS. 1 and 2, like reference numerals refer to like parts, unless otherwise specified.

The fluid-ejecting member 28 has a peripheral portion 52 that is positioned between the nozzle chamber wall 19 and the layer 26 of silicon nitride. A corrugated annular portion 54 is positioned adjacent to the peripheral portion 52. A fluid-ejecting portion 56 defines a remainder of the fluid-ejecting member 28.

The electrodes 18, 24 and their respective PTFE layers 32, 36 are dimensioned to define the air gap 40.

The corrugated portion 54 is configured to expand when the second electrode 24 is displaced towards the first electrode 18. The silicon nitride layer 26 imparts a resilient flexibility to the corrugated portion 54. Thus, the second electrode 24 returns to a quiescent condition when the electrical potential is removed.

The nozzle chamber wall 19 is shaped to define four radially spaced fluid inlet supply channels 58 that are in fluid communication with the space 41. These allow fluid to flow into the space 41 when the second electrode 24 is drawn towards the first electrode 18.

The nozzle chamber wall 19 defines air spaces 60 that are in fluid communication with the air gap 40. These allow the passage of air when the second electrode 24 moves towards and away from the first electrode 18.

The roof wall 20 has a plurality of etchant openings 62 defined therein to facilitate the etching of sacrificial material used in the fabrication of the chip 50. The etchant openings 62 are small enough to inhibit the passage of fluid as a result of surface tension effects.

It is important to note that the fluid-dispensing chip 10, 50 is essentially a micro-electromechanical systems (MEMS) device. A method for fabricating the device can readily be deduced from the description in referenced application no: U.S. Ser. No. 09/112,787 and in many of the other referenced applications.

Applicant envisages that the fluid-dispensing chip 10, 50 will be particularly suited for lab-on-a-chip applications. It can also be applied to DNA/RNA arrays, protein chips and sensing and dosing. The fluid-dispensing chip 10, 50 could also be used for drug delivery systems.

Numerous variations and/or modifications may be made to the present invention as shown in the preferred embodiment without departing from the spirit or scope of the invention as broadly described. The preferred embodiment is, therefore, to be considered in all respects to be illustrative and not restrictive.

The invention claimed is:

1. A micro-electromechanical device that comprises
a substrate;
a drive circuitry layer positioned on the substrate;
an electrode positioned on the drive circuitry layer;
a nozzle chamber wall and a roof wall positioned on the substrate to define a nozzle chamber above the substrate and a fluid ejection port in the roof wall;
a substantially planar deformable fluid ejecting member interposed between the electrode and the roof wall and configured to deform cyclically under action of a pulsed electromagnetic field, the drive circuitry configured to generate said pulsed electromagnetic field so that the fluid ejecting member acts on fluid to eject fluid from the fluid ejection port;
a projection positioned on at least one of the fluid ejecting member and the substrate to inhibit sticking of the ink ejecting member to the substrate; and,
complementary layers of hydrophobic material are positioned on the ink ejecting member and the substrate to inhibit sticking of the ink ejecting member to the substrate.

2. A micro-electromechanical device as claimed in claim 1, in which the nozzle chamber wall defines at least one fluid inlet to permit fluid to enter the nozzle chamber.

3. A micro-electromechanical device as claimed in claim 1, wherein the electrode is a first planar electrode and the fluid ejecting member includes a second planar electrode which is connected to the drive circuitry layer such that an electrical potential can be set up between the first and second planar electrodes, resulting in the fluid ejecting member being cyclically deformed to eject fluid from the fluid ejection port.

4. A micro-electromechanical device as claimed in claim 3, which includes a support formation that extends from the substrate to support a periphery of the fluid ejecting member above the substrate, such that a central region of the fluid ejecting member is drawn towards and away from the substrate when the electrodes are activated.

5. A micro-electromechanical device as claimed in claim 4, in which the fluid ejecting member is of a resiliently flexible member such that deformation of the member towards the substrate results in the build up of elastic energy in the member to enhance return movement and thus fluid ejection.

* * * * *